US008793684B2

(12) United States Patent
Breitgand et al.

(10) Patent No.: US 8,793,684 B2
(45) Date of Patent: Jul. 29, 2014

(54) OPTIMIZED DEPLOYMENT AND REPLICATION OF VIRTUAL MACHINES

(75) Inventors: David Breitgand, Modiin (IL); Irit Loy, Bet Hanania (IL); Kenneth Nagin, Hamovil (IL); Benny Rochwerger, Zichron Yaakov (IL); Ezra Silvera, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 13/048,909

(22) Filed: Mar. 16, 2011

(65) Prior Publication Data

US 2012/0240110 A1 Sep. 20, 2012

(51) Int. Cl.
*G06F 9/455* (2006.01)
(52) U.S. Cl.
USPC ............................................................ 718/1
(58) Field of Classification Search
None
See application file for complete search history.

(56) References Cited

U.S. PATENT DOCUMENTS 7,350,206 B2  3/2008  Singhal
7,356,679 B1*  4/2008  Le et al. .............................. 713/1
2009/0260007 A1*  10/2009  Beaty et al. ........................ 718/1
2011/0246566 A1*  10/2011  Kashef et al. .................. 709/203
2011/0295560 A1*  12/2011  Crockford ...................... 702/187

OTHER PUBLICATIONS

Yang Chen et al., "An Efficient Resource Management System for On-line Virtual Cluster Provision", IEEE International Conference on Cloud Computing (CLOUD), 72-9, 2009; Publisher: IEEE, Piscataway, NJ, USA.

* cited by examiner

*Primary Examiner* — Mengyao Zhe
(74) *Attorney, Agent, or Firm* — Jason Far-Ladian; Century IP

(57) ABSTRACT

Systems and methods for deploying a virtual machine (VM) on a host are provided. An exemplary method comprises notifying a host to download a master copy of a VM image from a remotely located network storage device, in response to a service provider providing a definition manifest for a service request supported by the VM, wherein the host deploys the VM directly from the VM image downloaded to a storage medium locally connected to the host machine, wherein deployment of the VM allows the host to locally service the service request associated with the definition manifest, wherein the host replicates copies of the VM image, in response to receiving additional service requests to create one or more VM clones; wherein the host customizes the one or more VM clones based on the definition manifest.

15 Claims, 13 Drawing Sheets

After consolidation with Live Migration with non-shared storage, VEEs migrated to VEEH A and VEEH B.

OPTIMIZED DEPLOYMENT AND REPLICATION OF VIRTUAL MACHINES

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to optimizing the deployment and replication of virtual machines in a network environment.

BACKGROUND

In some computing networks, shared computing resources are provided to computing systems and other devices connected to the network, on demand, by way of deploying one or more virtual machines (VMs). A VM, generally, runs as a software application and supports the related services to provide a platform-independent programming environment that abstracts away details of the underlying hardware or operating system for the party requesting the respective services.

VMs are typically provided by a management layer being part of the network architecture. The management layer downloads VM images from a remote repository to a local storage medium that is shared with the virtualization platform. The management layer then deploys the VM by executing the image stored at the locally shared storage medium. In this network architecture, the virtualization hosting platform is a passive recipient of the VM image until the point in time when the image is remotely deployed by the management layer.

Accordingly, the initial responsibility for VM provisioning and deployment has been traditionally assigned to the management layer. The virtualization platform's primary function is to provide an abstraction of physical resources to the remotely located management layer. It is desirable to allocate storage for VM provisioning at the virtualization platform host level, especially when the management layer is not well suited to exploit host-level services and techniques such as local caching or near storage VM cloning.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Systems and methods for deploying a virtual machine (VM) on a host are provided. An exemplary method comprises notifying a host to download a master copy of a VM image from a remotely located network storage device, in response to a service provider providing a definition manifest for a service request supported by the VM, wherein the host deploys the VM directly from the VM image downloaded to a storage medium locally connected to the host machine, wherein deployment of the VM allows the host to locally service the service request associated with the definition manifest, wherein the host replicates copies of the VM image, in response to receiving additional service requests to create one or more VM clones; wherein the host customizes the one or more VM clones based on the definition manifest.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
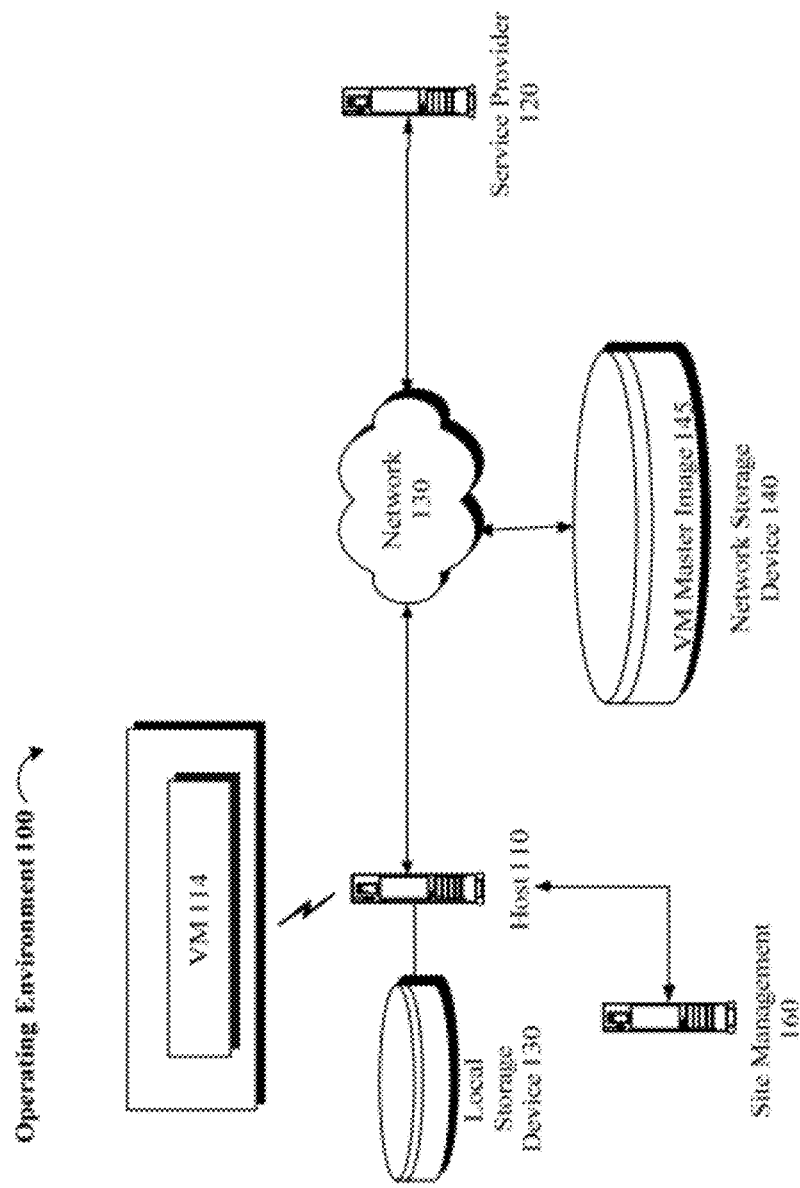
FIGS. 1 and 2 respectively illustrate an exemplary operating environment and an exemplary method in accordance with one or more embodiments, wherein a host platform is configured to service a plurality of requests.

Referring to FIG. 1, an exemplary operating environment is illustrated, wherein a service provider 120 is in communication with a virtualization platform host 110 (hereafter host 110) by way of a public network 130 (hereafter network 130). Service provider 120 may be implemented, for example, over a platform that supports Infrastructure as a Service (IaaS)). IaaS delivers computing infrastructure—typically a platform virtualization environment—as a service. The hosting platform may be implemented over any type of virtualization infrastructure (e.g., XEN, KVM, PHYPE etc.). Service provider 120 is in communication with a site management 160 by way of network 130. The site management 160 may be in communication with host 110 over an IaaS's private network (not shown). The host 110 accesses the network storage 140 by way of network 130.

Figure 2:
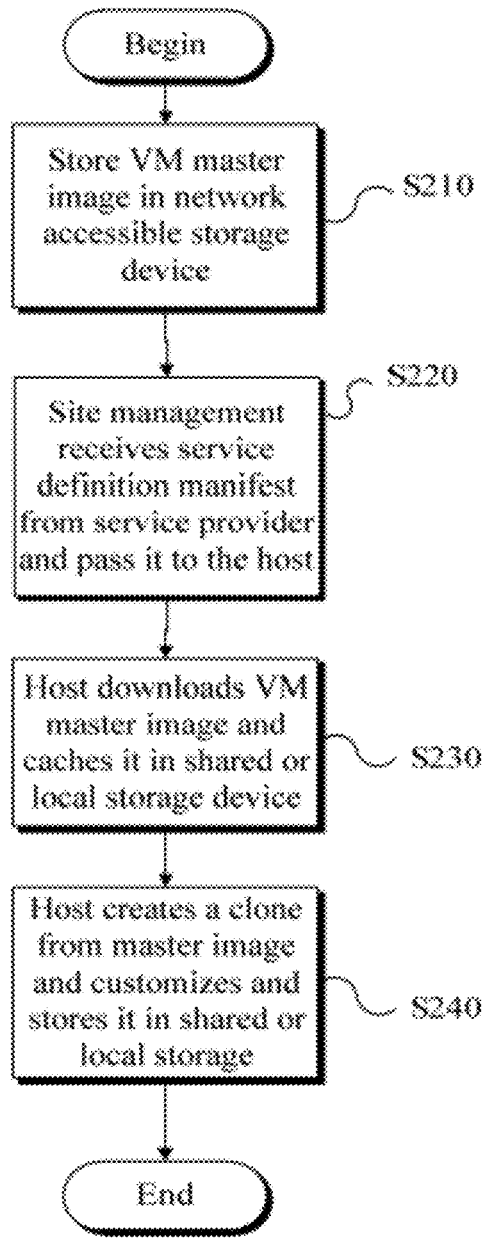

Referring to FIG. 2, service provider 120 stores, in a network storage device 140, at least one VM master image 145 (S210), where said VM master image may be utilized for the applications (i.e., services) that are to be provisioned as a VM 114 on host 110. The service provider 120 may specify the applications' components (i.e., images and digests) in a service definition manifest. Site management 160 receives service definition manifest from service provider 120 and passes it or parts of it, to the host 110 (S220) and causes the VM 114 to be hosted on host 110.

In one embodiment, host 110 downloads VM master image 145 to a local storage device 130 from network storage device 140 based on the service definition manifest and caches it in the shared or local storage device (S230). Host 110 creates a clone from VM master image 145 and customizes and stores it in shared or local storage (S240). Note that the cached VM master image 145 is not altered and may be used for future clones, thus avoiding the lengthy initial download of the VM master image 145. Local storage device 130 may be a direct-attached storage (DAS) device (i.e., a digital storage system directly attached to the host, without a storage network in between), whereas a shared storage may be connected to host 110 via a storage area network (SAN) or a network attached storage (NAS) device, depending on implementation.

In one embodiment, host 110 stores (e.g., caches) a copy of VM master image 145 on local storage device 130. Alternatively, a copy of the VM master image 145 may be cached in a shared site storage by host 110. In both cases the host 110, instead of site management 160, handles the responsibility for said caching operation. As provided in further detail below, the clones of the master image may be created by way of a copy-on-write process to act as boot images of VM 114.

Briefly, copy-on-write refers to the process of creating an instant copy of an image of a target application (e.g., resource) by way of pointing to the original image of the target application, instead of copying the image, for example, byte by byte. A duplicate copy of the image may be later created when needed (e.g., when the image is to be written to). As such, if multiple requests are received for the same resource, a pointer to the resource may be provided first and the copying may be postponed to a later time (e.g., when the resource is being modified). In one embodiment, the copying may be started in the background (when the system is idle, for example) instead of waiting until the moment when there is the ultimate need for copying. The background copy may be referred to as background synchronization.

Accordingly, in one implementation, using the copy-on-write process, a clone of the VM's image may be created instantly when additional requests for the services provided by VM 114 are received. This strategy avoids the need for creating multiple redundant copies of the VM's image in advance and in anticipation of future service requests which may never materialize in earnest. It is noteworthy that elasticity for provisioning host 110 services may be achieved by storing in advance, or by copying on demand, multiple copies of VM's image and deploying said images as need arises.

Certain parameters (e.g., system bandwidth, service requests, application history and execution pattern, etc.) may be used to determine in advance when, how often and how many copies of VM's image are to be cloned. Same or related parameters may be used to determine whether to store copies of the VM's image on local stand alone storage media, shared storage media, remotely available network storage devices, or a combination of all.

For example when application-induced network usage combined with the background synchronization processes causes network usage to exceed some threshold value; the background synchronization controller will automatically reduce bandwidth available to background synchronization. To further optimize this process, the controller may preferentially treat synchronization processes being in different stages of progress, aiming at maximizing the total number of background synchronization completions in shortest possible time.

In the following the above disclosed concepts, processes and implementations are discussed in further detail with reference to specific embodiments and methodologies that are common to virtualization in a computing environment and particularly as applicable within the context of cloud computing. It is noteworthy, however, that the disclosed embodiments here are exemplary and in no event should be construed as limiting the scope of the claimed subject matter to particular exemplary embodiments.

For the purpose of brevity, in the following, we may refer to the virtualized image as the virtual execution environment (VEE) and to the host as the virtualization hosting platform or the VEE Host (VEEH). The management layer, as disclosed, may optionally comprise two layers the service manager (SM) and VEE manager (VEEM). The SM is responsible for interacting with the service providers to receive new applications to deploy and the VEEM is responsible for VEE placement.

In accordance with one embodiment, one function of a VEEH is to provide an abstraction of physical resources to the management layer to allocate the storage related to VEE provisioning. The VEEH is equipped to exploit local host caching and near storage cloning techniques to quickly customize VEE instances. Further, parallel provisioning of many VEEs may be achieved by distributing cached VM master and cloned images among multiple VEEHs in a data center as provided in further detail below.

In certain embodiments, VEEH provisioning is advantageously utilized to support elastic applications that grow or shrink dynamically, wherein image cloning and customization is performed based on the locally available cached images distributed across the data center to support rapid provisioning. An elastic application may dynamically increase or decrease the number of instances of any of its component VMs. Elasticity offers unlimited application scalability. This scalability is achieved mainly through horizontal scaling (scale-out) of the application by creating new VEEs derived from a component's master image.

The process of creating new VEEs for the elastic applications may be automated throughout the management layer (e.g., IaaS) stack. A service definition manifest may be utilized to provide predefined specifications on how to customize new VEE images or instances, and rules of when to expand an application by creating new VEEs, which trigger SM to request that VEEM deploy new customized VEE instances. VEEM may decide on the optimal VEE placement and request that VEEH to activate the new VEE instances.

The customized image may be based on a locally cached copy of the original master image. The original master image is downloaded from a repository owned by a cloud service provider. The downloaded image may be then cloned and customized. We refer to the downloading and subsequent customization as VEE provisioning. Typically the VEE provisioning is done by the management layer, either SM or VEEM. In accordance with one embodiment, the VEEH downloads the master image instead of the management layer. VEEH exploits local host caching and near storage cloning techniques to quickly customize VEE instances. Parallel provisioning of many VEEs can be achieved by distributing the required cached masters and clones amongst the many VEEHs in a data center.

In some embodiments, a local storage device (e.g., a DAS) may be used to house the cache copy of the master image and their clones. With local storage, better I/O rates can be achieved without incurring the cost of configuring the IaaS with high speed I/O networks to support SAN or the performance overhead associated with NAS. Master images may be stored in a cloud network, for example, by service providers prior to elastic application deployment.

VEEH caches and clones the images to create unique VEE instances. The cached master images and their clones are distributed amongst the site's numerous VEEHs. Storage for the cached images and clones may be DAS or shared amongst pools of VEEH with NAS or SAN. Hybrid topologies that allow a data center to configure its hosts with a mix of shared and non-shared storage may be also implemented, to allow system administrators more flexibility, when configuring the storage space.

In one embodiment, VEEH handles a cached master image with following tasks:

Creation—SM decides to deploy an elastic application and VEEM decides upon which hosts to run its VEEs. VEEH then provisions the VEE instances. The host that provisions a VEE verifies whether a cache of the master image exists. If not, it caches the master image by downloading it to its cache. It verifies whether a master image is already cached by using the master image's URL as unique identifier and comparing images digest with the cached image's digest. As noted earlier, when the service provider decides to deploy an application, the service provider specifies the application components' image URLs and their digests (e.g., MD5, SHA-1), in a service definition manifest and passes the manifest to SM. As such, the time consuming process of downloading large master images from the cloud desirably occurs on the initial deployment.

Data Deduplication—Once the master is cached it is reused to support elastic application growth or re-deployment of the same application. The cached instance of the master image is reused as a base for quickly creating many clones. Cloning is performed by creating a copying of the cached master image.

Destruction—The cached image is destroyed either upon a specific request to remove the application from the site or if there is a timeout defined on the cache.

In one embodiment, VEEH supports the following caching models:

Centralized Caching—A VEEH proxy on the site's management node is responsible for downloading all required master images and their digests from the service provider's network storage in the cloud to a VEEH's cache. The option of having a centralized approach for caching master images provides a solution for data centers where internet access is limited to site's management node to download from the cloud.

Figure 3A:
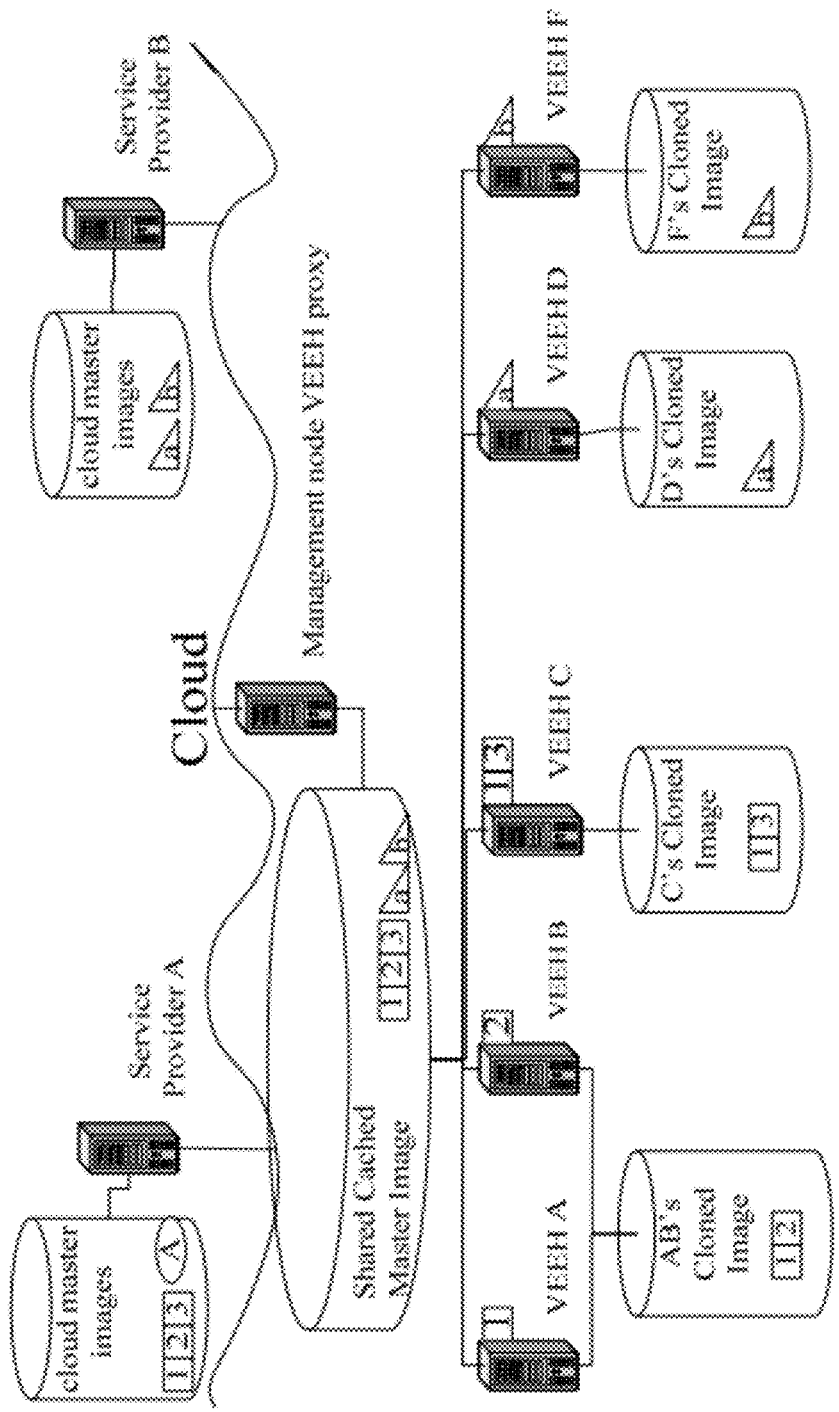
FIG. 3A illustrates a centralized service provider, in accordance with one or more embodiments.

Referring to FIG. 3A, a centralized caching in accordance with one or more embodiments is provided. As shown, an exemplary embodiment is illustrated in a state that is post deploying two applications "123" and "ab". Application 123 has three components 1, 2 and 3. Application ab has two components 'a' and 'b'. Application 123's component master images are represented as rectangles. Application ab's component master images are represented as triangles, for example. Component VEE instances are represented as rectangles or triangles.

The Management Node's VEEH proxy handles master image downloads from the cloud and caches the two applications' master images in the site's shared master image cache. VEEH A hosts a VEE instance of component 1. VEEH B hosts a VEE instance of component 2. VEEH C hosts a VEE instance of component 3 and another instance of component 2. VEEH D hosts a VEE instance of component a. VEEH E hosts a VEE instance of component b. The VEEH centralized caching model provides an abstraction above the physical storage.

Distributed Caching—The many VEEHs may download master images directly from the cloud to their caches. Distributed caching allows the site to download multiple images in parallel. An application with multiple components can be deployed more quickly than deploying each component sequentially. Likewise when an elastic application dynamically grows, multiple instances can be instantiated in parallel. Further, distributed caching scales to support the parallel deployment of multiple applications.

Figure 3B:
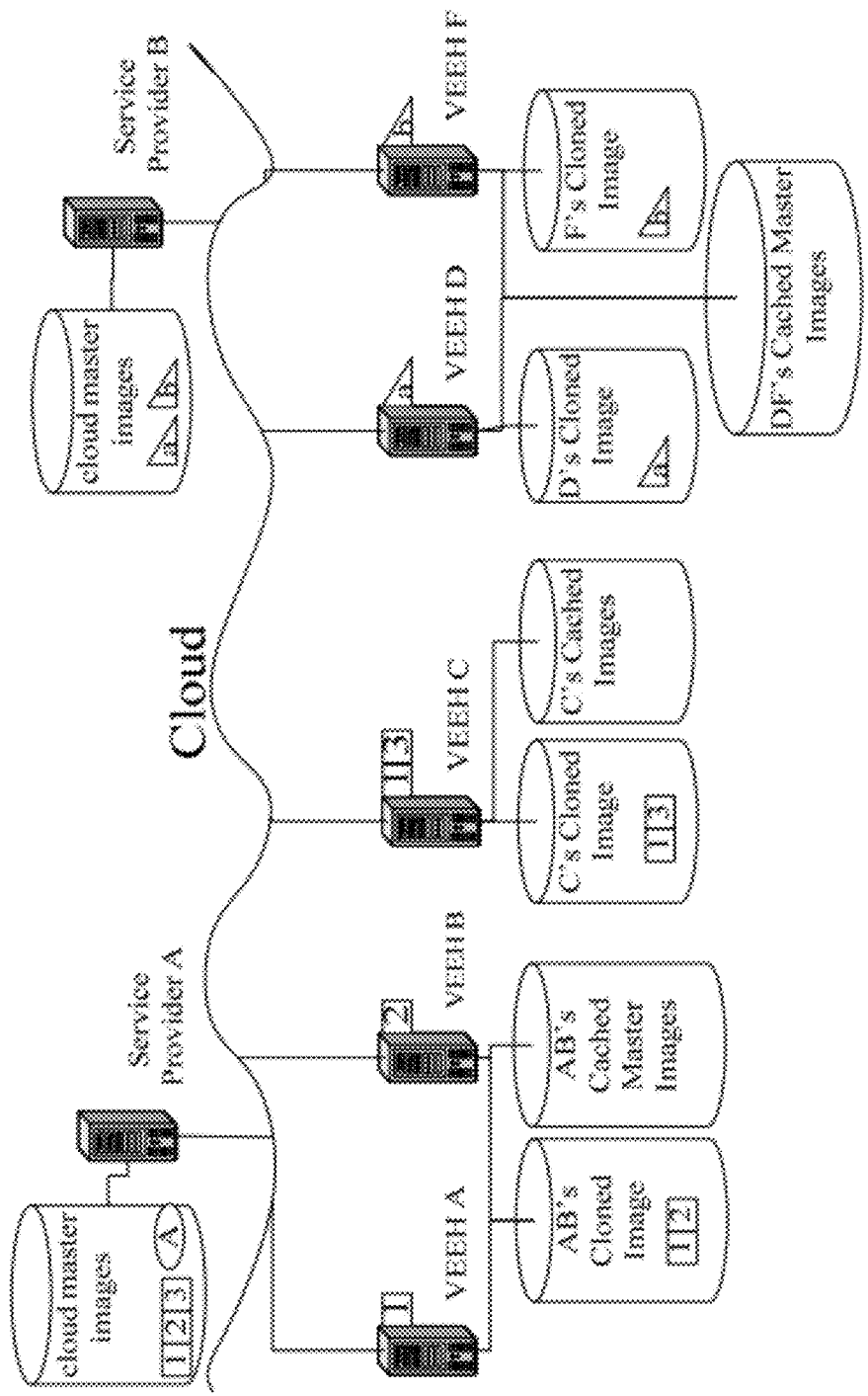
FIG. 3B illustrates a distributed caching environment configured with shared network storage and local storage, according to one or more embodiments.

Referring to FIG. 3B, a distributed caching environment configured with shared NAS storage and local DAS storage is illustrated according to one or more embodiments. Both FIGS. 3A and 3B illustrate deployment of the same to two applications, 123 and ab. However, FIG. 3B illustrates a distribution of the application master images amongst the various VEEHs' caches. The mixed NAS and DAS storage configuration; VEEH A and VEEH B cache to the same NAS pool, VEEH D and VEEH B also share another NAS pool, but VEEH C caches to its own DAS pool. VEEH AB's cache contains cached master images for components 1 and 2 to back deployment of VEE instances 1 and 2.

Depending on implementation, VEEH DF's cache contains cached master images for components a and b to back deployment of VEE instances a and b. VEEH C's cache contains cached master images for components 1 and 3 to back deployment of VEE instances 1 and 3. In one embodiment, the master image for component 1 is cached in both VEEH AB's and VEEH C's caches, since VEEH C doesn't share its repository with VEEH A and VEEH B. The VEEH Distributed Cache model has a distinct advantage over a management layer solution since it exploits parallel provisioning and allows for more flexible storage configurations. The duplication of images across the data centers may be one of the disadvantages of a flexible storage configuration with multiples pools of shared and unshared storage.

Distributed Peer-to-Peer (P2P) Caching—This model extends distributed caching model by supporting the sharing of cached master images between VEEHs. This is particularly useful when a data center is configured with many DAS caches or pools of shared storage caches. P2P sharing is accomplished by downloading parts of a cached master image in parallel from many VEEHs to the VEEH that requires the image. In general, as the number of copies of a master image distributed across the data center increases, to some limit, the time required to share the image with another VEEH decreases.

For example, consider the case of expanding a previously deployed elastic application, but the VEEHs targeted to host the expansion do not currently contain the required cached master images in their cache. In the centralized or distributed caching models it would be necessary to download the master image from the cloud. In the P2P Management model it could share master images from the VEEHs that initially provisioned the application. Since the sharing operation occurs over the Local Area Network (LAN) the time to share a single copy of a cached master image would be less than downloading from the cloud.

In general, provisioning becomes more rapid as the application consumes more resources and expands since subsequent elastic expansions would potentially have more images to share and create even more shared instances. Depending on implementation, when a data center is configured with many DASs or pools of shared storage, the VEEH P2P management solution's advantage over a management layer solution goes beyond distributed caching, since it also exploits the distribution of cache images in the data center.

Cloned Images—once a master image is cached it is cloned and customized to create a VEE instance. VEEH clones and customizes VEE instances with the following tasks: clone creation, clone customization, instantiation, and destruction.

Clone Creation—Cloning is performed by creating a copying of the cached master image. The two cloning methods that may be supported include image duplication (e.g., the master image is duplicated by copying the cached master image to a new file—in most cases, in-storage copy of the cached image is much faster than downloading the original from the cloud) and rapid image cloning (e.g., the source data deduplication method known as copy-on-write (CoW) may be leveraged to make a virtual copy of the cached master image as provided in further detail below).

CoW allocates storage for a file that is backed by the cached master image. Only changed blocks are recorded in the new file. In an exemplary embodiment, the Linux utility qemu-img may be used to create clones with CoW. CoW allows sharing of the same cached master image amongst many clone instances, thus reducing the storage required to deploy an elastic application. Further it reduces the clone creation time to less than a second. The savings can be considerable when deploying very large applications. Rapid cloning with CoW is helpful in the context of elasticity. The elastic expansion option provides an automated on-demand mechanism to respond rapidly to increases in demand.

Clone Customization—Once the cache master image is cloned it is ready for customization and VEE creation.

Instantiation—A running VEE is created from the cloned image and connected to Virtual Area Network (VAN). The VEE may be activated immediately or suspended shortly after creation. The suspension option is provided to support the ordered deployment of an elastic application that exploits VEE creation across many VEEHs in parallel.

For example, consider the case of an elastic application composed of more than one component. Each component would be deployed as a VEE instance. Ordering of the components deployment may be required. For instance if one of the components is a NFS server then its activation must precede activation of the other servers that mount the NFS server's file system. Optimal deployment of VMs may be achieved if the VMs are deployed in parallel across the hosts in the data center.

Sequential deployment may increase the total application deployment time (TADT) to a multiple of the activation time for each VM. Suspending the VEE shortly after creation allows us to deploy all the components in parallel and resume them in their required order, resulting in a lower TADT.

Destruction—The cloned image is removed when the appropriate virtual machine is destroyed or migrated to another site.

In some implementations, cloning compliments master image caching, since cached master images are reused to speed up VEE instantiation. Like the cached master images, the physical storage that the clones occupy may be shared amongst many or all VEEHs. However, A VEEH's cached images and clones are not required to reside on the same physical storage. This provides flexibility when configuring storage.

FIGS. 3A and 3B illustrate a NAS and DAS storage configuration for housing its clones. VEEH A and VEEH B clone to the same NAS pool, however VEEH C, VEEH D and VEEH F each have their own private DAS pools. The storage configurations to house cached master images and their clones may be orthogonal to each other as provided in further detail below.

VEE Customization—once a master image is cached it is cloned to create a VEE instance. Cloning is performed by the VEEH making a copy of a cached master image. The customization stack combines service definition manifest rules on how and when to automatically generate values for customization parameters and a mechanism to pass the values to the VEE clones. In the one embodiment, the service provider and the cloud infrastructure provider are separated. The service provider specifies rules to generate parameters for customizing their application's components and integrates an activation engine inside their images that will customize the components.

In order to provide a distinguishable identity to virtual machines created from a master image, the image may be customized by setting specific values to predefined parameters. Such parameters may include networking parameters, e.g., hostnames, IP addresses, etc., various management parameters, e.g., passwords, or any other application specifics. In order to support the above, the following two issues must be dealt with: (1) How to generate unique parameter values on-demand? (2) How to instantiate a VEE clone with the values?

The first issue may be managed by SM or VEEH. The second issue may be managed by VEEH since it creates the clones. In the following, a method for automatic generation of image customization data is provided, allowing the service provider to define rules on how to generate the values for image and application specific parameters. The rules are defined for each master image by the service provider. The SM or VEEM may automatically generate unique parameter values and on demand, for each VEE instantiated from the master.

A customization transport mechanism may be defined as provided below. Once a VEE is created from a master image, VEEH constructs an apparatus to pass generated VEE-personalized parameters to the image during image instantiation. Once the parameters are passed to the VEE, scripts residing inside the master image are activated to recognize and process the transferred customization parameters. By implementing the above, a virtual channel is established between the service provider and the VM running on a host, and the channel is used to pass customization data.

The service provider defining how to customize master image parameters in the service definition manifest is one endpoint of the channel. The VEEH is the other endpoint, responsible for passing the image-specific parameters to the instance of the master image on boot. The mechanism for definition and automatic generation of image customization data, along with the isolated channel for passing customization data, ensures the separation between the service provider and the infrastructure provider, and allows the distributed elastic provisioning.

Referring to FIGS. 3C to 3F, an exemplary scenario with the host based parallel and distributed provisioning of an elastic application is provided, in accordance with one embodiment. The example elastic application is composed of the two applications, application 123 and application ab. Application 123's service definition manifest provides that the initial deployment should create two VEE instances of component 1, one VEE instance of component 2, and one VEE instance of component 3.

The VEE 1 instances must be activated before the VEE 2 and VEE 3 instances. An elastic rule is defined that expands the application by creating other VEE 2 and VEE 3 instances. The IaaS site contains four VEEH servers, A, B, C, D and F. The site is configured with both NAS and DAS to house the Cached Master Images and Cloned Images storage pools. As provided earlier, the caching of master images may be handled with P2P caching and CoW may be used to clone images.

Figure 3C:
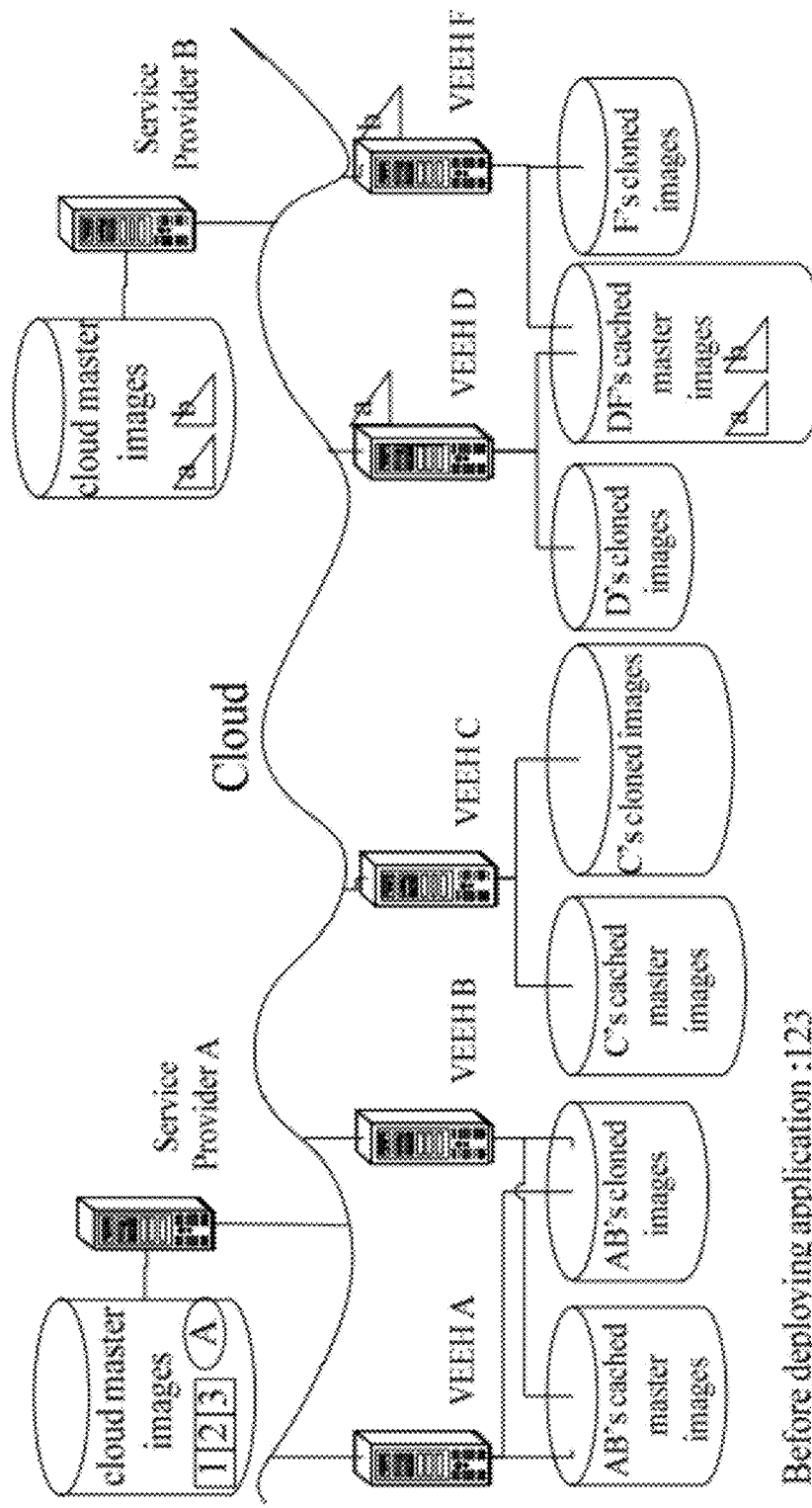
FIGS. 3C to 3F illustrate an exemplary scenario involving a host-based parallel and distributed provisioning of an elastic application, in accordance with one embodiment.
Figure 3D:
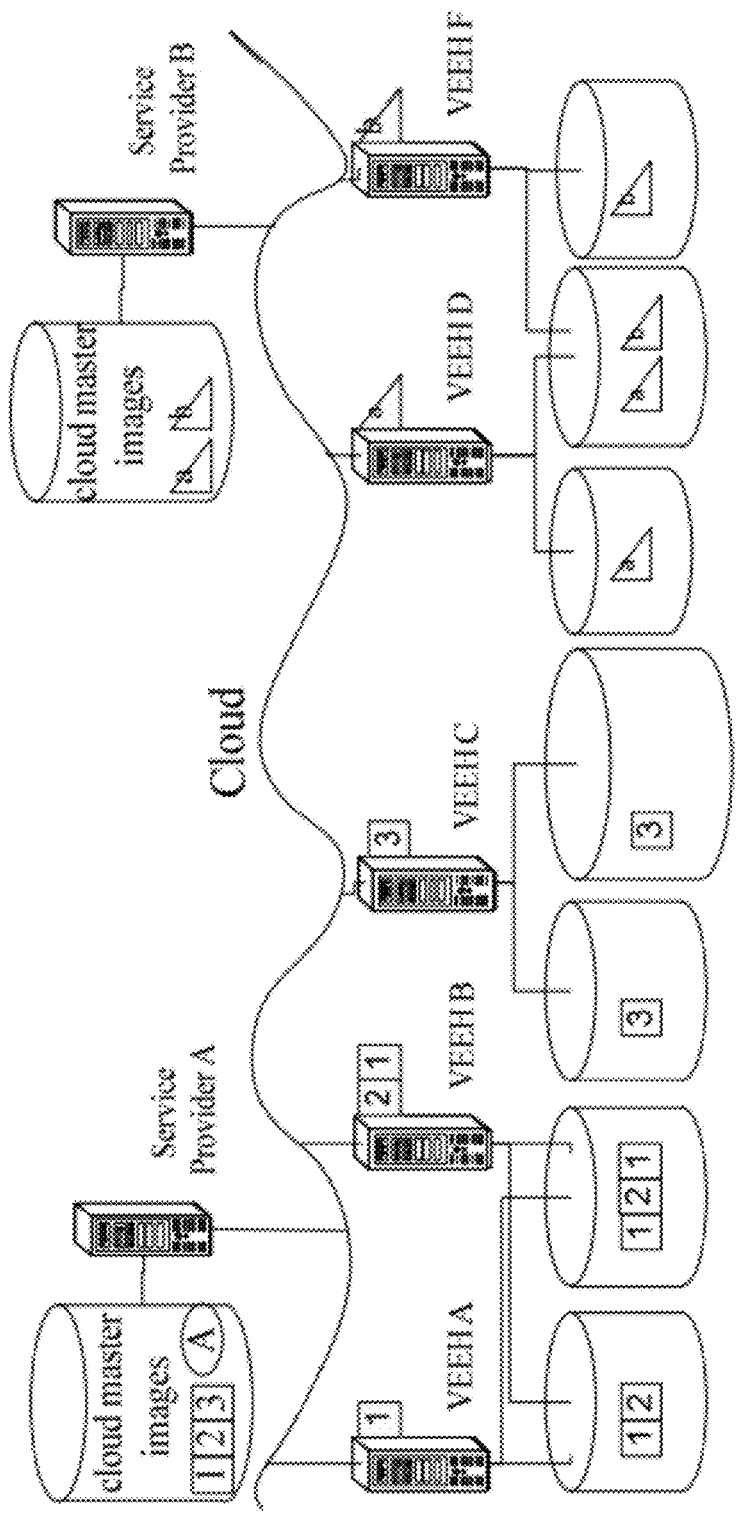
Figure 3E:
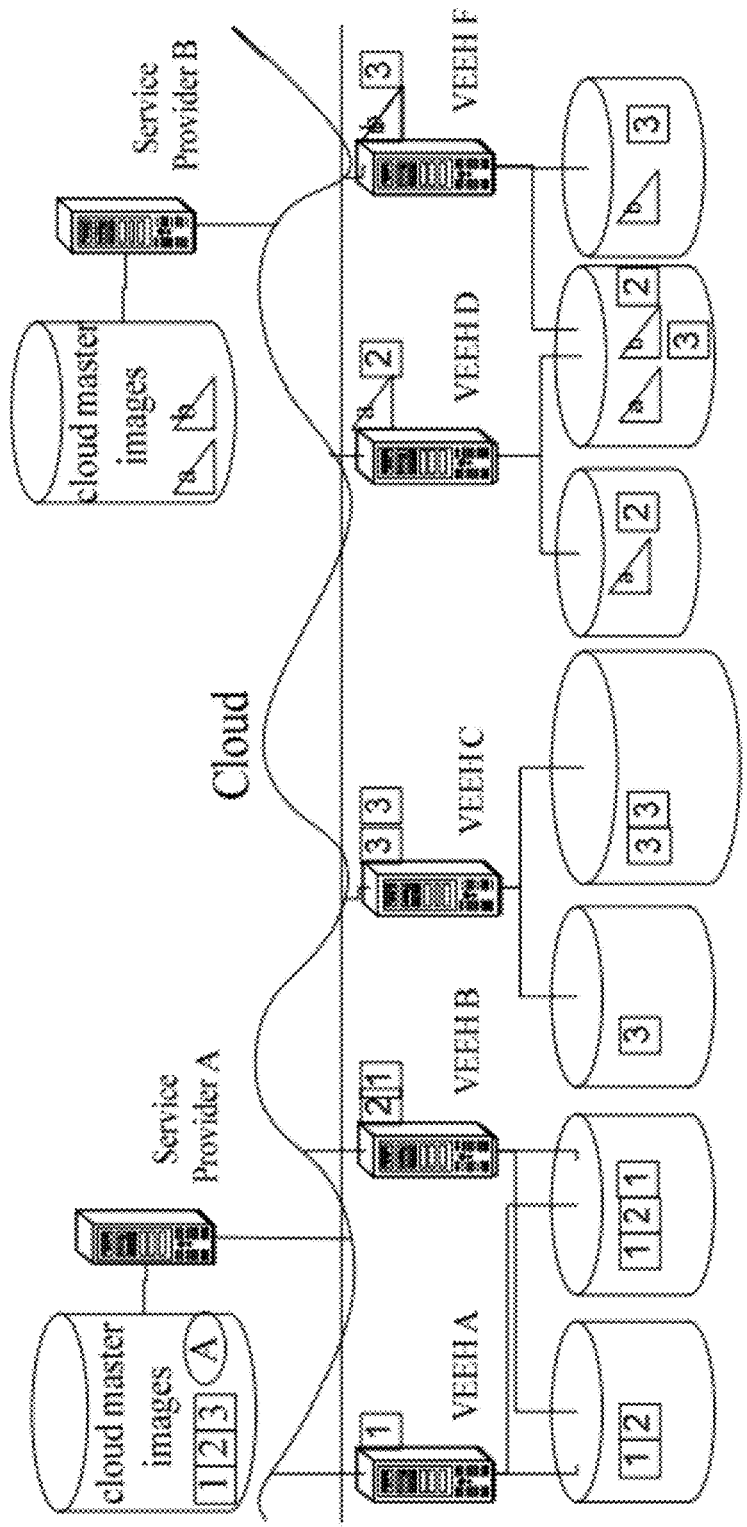
Figure 3F:
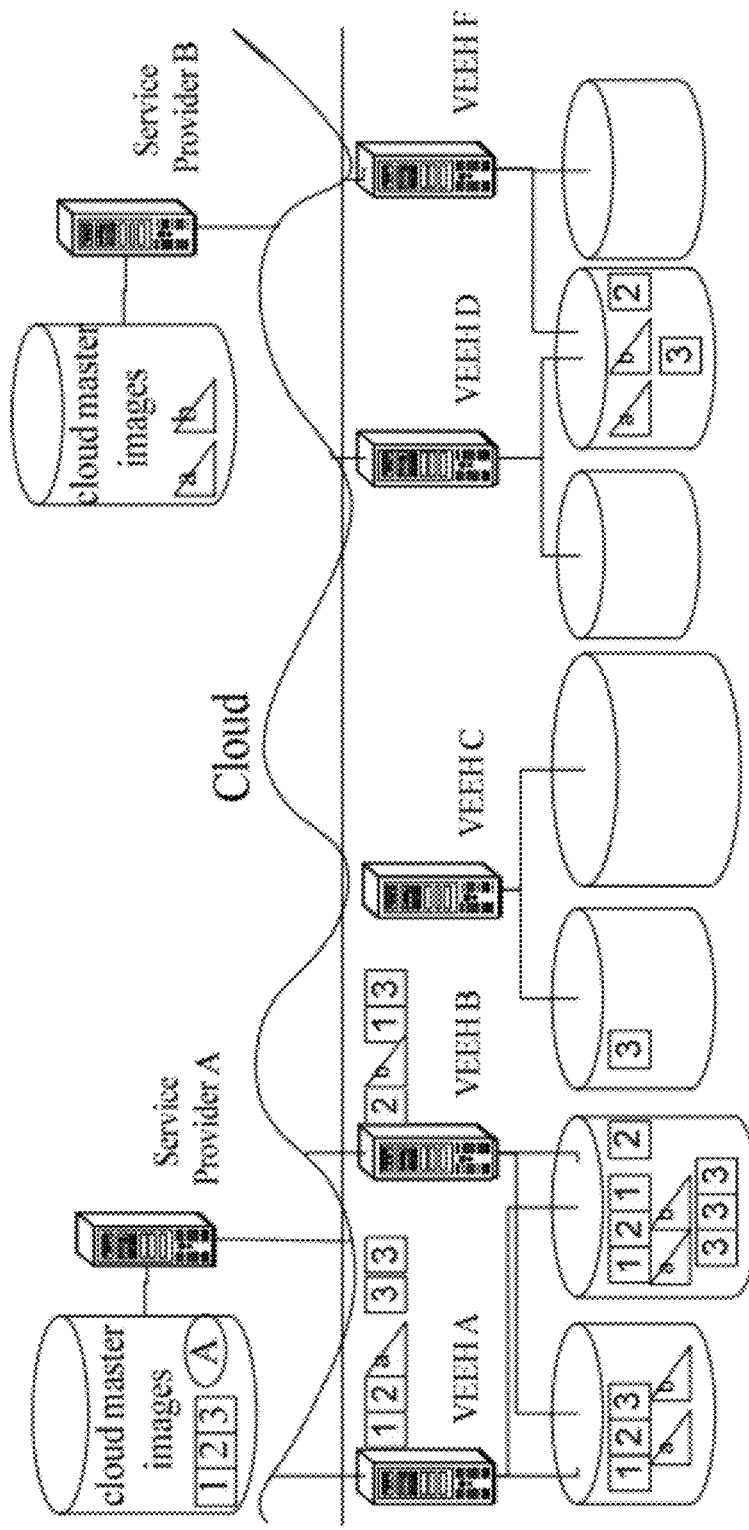

In the following, events and flows relating to deploying application 123, elastic expansion of 123 and data center consolidation to support lower power utilization are provided:

1. The site prior to the deploying application 123 is illustrated in FIG. 3C. Application ab is already deployed, with VEE instance a running on VEEH D.
2. Application 123 is deployed. The placement policy is currently Load Balancing so VEEM spreads the VEEs evenly amongst the VEEHs:
   (a) The application's master images are cached by downloading the images in parallel from Service Provider A. VEEH A caches the master image for component 1. VEEH B caches the master image for component 2. VEEH C caches the master image for component 3. The images are distributed to the various VEEHs' master image caches.
   (b) VEE instances of the application components are instantiated in parallel by cloning, customizing and creating them in active or suspended state. The cloned images are distributed to the various VEEHs. VEEH A instantiates one VEE 1 instance in active state. VEEH B instantiates one VEE 2 instance in suspended state and another VEE 1 instance in active state. Notice that VEEH B did not have to cache another master image of component 1 because it was already cached by VEEH A. VEEH C instantiates one VEE 3 instance in suspended state.
   (c) VEE instances 2 and 3 are resumed in parallel. VEEH B resumes the VEE 1 instance. VEEH C resumes the VEE 2 instance.
3. An elastic rule is triggered to expand application 123 with one VEE 2 and two more VEE 3. VEEM places a new VEE 2 instance on VEEH D and the new VEE 3 instance on VEEH F and another VEE 3 instances on VEEH C:
   (a) In parallel, VEEH D caches a master image for VEE 2 using P2P to copy the master image that resides in VEEH D's repository and VEEH D caches a master image for VEE 3 using P2P to copy from VEEH C.
   (b) VEEH C, VEEH D and VEEH F clone, customize and activate a new VEE 3, a VEE 2 and another VEE 3 instances. Note, VEEH C does need to cache another master image for 3 since it already exists in its cache.

Referring back to the process of using CoW in tandem with policy-controlled background synchronization to provision replicated resources in a network environment, in one embodiment, the system balances a trade-off between the initial provisioning delay and performance degradation due to I/O delay after initial provisioning, by varying the rate of background replication either adaptively or according to a pre-defined policy stemming from a best practice.

Using CoW in the above exemplary cases helps reducing the time to provision the required resources. The background synchronization also helps mitigate the performance penalties associated with write operations. Background synchronization may incur an overhead, however, because it consumes valuable resources such as bandwidth and this may interfere with performance of the CoW-provisioned resource and other resources using the same shared networking infrastructure (e.g., VMs sharing the same physical host and thus sharing the same physical NIC). Therefore, utility of the background synchronization may be optimized through a policy-driven background synchronization controller.

For example, if background synchronization is set at a low rate, it may not keep up pace with I/O operations being performed on the resource being synchronized, thus rendering synchronization overhead utility zero or even negative if this process also impacts other services performance. If background synchronization is set at a too high rate, synchronization cancels the advantages of using CoW. Seeking an optimal rate, possibly adaptively, will set synchronization process at an optimal rate where utility is maximized.

In one embodiment, application components are represented by virtual machines (VMs) and their virtual resources in the cloud. An elastic application may dynamically increase or decrease the number of instances of any of its component VMs. Elasticity virtually offers unlimited application scalability. This scalability is achieved mainly through horizontal scaling (scale-out) of the application by creating new VMs derived from a component's master image. The process of creating new VMs for the elastic applications may be automated.

A service definition manifest comprising predefined specifications on how to customize new VM instances, and rules of when to expand an application by creating new VMs, which trigger the system to deploy a new customized VM instances may be provided. The customized image may be based on a master image which is downloaded from a repository owned by a cloud service provider. The downloaded image is then customized. The downloading and subsequent customization constitutes VM provisioning as provided earlier.

In one embodiment, the master image is downloaded and customized in place. To speed up VM provisioning caching of master images and subsequent cloning for customization may be used as provided above. As also noted earlier, CoW may be utilized to make the cloning operation more efficient. CoW may however degrade the I/O performance of an application when it modifies a lot of data from the original master copy. In order to mitigate this I/O performance degradation a background process may be added to synchronize the CoW image with its cached master. Once synchronization is completed, there is no write penalty associated with the synchronized image. However, the background synchronization process may consume valuable resources and, therefore, a policy-driven control of the background image data transfer would be helpful to optimize the process.

It should be noted that there is no single universal policy to handle all possible situations. Therefore, in some embodiments, an adaptive synchronization process may be utilized. CoW and background synchronization may be used to capture a point-in-time image. Sections of the base image may be written after the CoW image is updated. In one embodiment, the CoW image is written to by the user during synchronization and the base image stays intact. Further, the base image may be a base for one or more unique CoW images that may be written too at anytime. As such, CoW may be utilized as a mechanism to create customized clones of virtual resources, as noted earlier.

The policies governing the rate of background synchronization may differ from those to govern storage controller flash copy synchronization. The storage controller balances its background synchronization against I/O requirements of the whole system and minimum time allowed to complete a point-in-time copy. For example, quality of service agreements formulated with the customer defining the type of performance that they expect and the minimum elapse type to deploy a clone of some virtual resource. Using more bandwidth to complete background synchronization faster may impact performance of already deployed services creating I/O bottleneck in the network. On the other hand using less bandwidth results in longer synchronization time and I/O overhead of the newly deployed service, which may result in breach of this service's performance SLOs. The optimization is therefore a system-wide where the total benefit of all deployed services is being optimized.

The above implementation will allow the deployment of virtual resources more rapidly with a controlled strategy to mitigate any performance related degradation. As suggested earlier, in one embodiment, the master copy is cached at the site's local storage. Once a master image is cached it is cloned and customized to create a VM instance. Cloning is performed by creating a copy of the cached master image. The proposed CoW-based cloning method allocates storage for a file that is backed by the cached master image. Changed blocks are recorded in the new file. CoW allows sharing of the same cached master image amongst many clone instances, thus reducing the storage required to deploy an elastic application. Further it reduces the clone creation time. The savings can be considerable when deploying very large applications. Rapid cloning with CoW is also helpful in the context of elasticity as disclosed above and provides for an automated on-demand mechanism to respond rapidly to increases in demand.

As noted, since CoW degrades the I/O performance of the application and the tendency for data fragmentation in the physical storage, a background process may be utilized to synchronize the CoW image with its cached master. The process would simulate modification of chunks of data in the subject CoW image, causing chunks of data to be copied in an orderly sequential fashion from the cached master to the area allocated for the clone. Once completed there is no write penalty associated with the synchronized image.

To control the overhead of the background synchronization, network usage is monitored and optimal residual network bandwidth is computed and allocated to the background synchronization without compromising QoS of other services. For example, network usage of the running services may be monitored. Typically this monitoring information is readily available through SNMP and NetFlow protocols that are deployed for other management purposes in modern data centers. When application-induced network usage combined with the background synchronization processes network usage exceeds some threshold value, the background synchronization controller may automatically reduce bandwidth available to background synchronization. To further optimize this process, the controller may preferentially treat synchronization processes being in different stages of progress, aiming at maximizing the total number of background synchronization completions in shortest possible time.

In one embodiment, a background synchronization policy may be implemented based on prior knowledge about clone write request probabilities distribution. This knowledge is possible in the elastic computing use case, where VM instances are being added and removed on demand to match variations in the workload. In this scenario, statistics may be gathered on the write requests that are applied to clones when they created and the time-dependent probabilities for referencing shards comprising the clone image may be computed. Thus, one background synchronization policy may pre-schedule shards copying subject to maximal disk throughput allocated to background copying constraint.

In one embodiment, the algorithm partitions the time axis into windows of equal duration where duration D is configurable. For each time window W there is a plurality of shards $s \in [1, H]$, where each shard is written with probability $P\{w,s\}$. Let B be maximum bandwidth allowed for background synchronization in any window, where B is configurable parameter, being configured by administrator. Each time window is treated as a bin of capacity C. Each shard is treated as an item that can be allocated into any of the bins (i.e., scheduled for copying in this window), but value of the each item (i.e., shard) varies across bins as $V(s, w)=P(w,s)$. Accordingly, the total value of scheduling is maximized by: $\max Z=\sum_{i}^{W}\sum_{s}^{H} x_{i,s}*V(s,i)$, where $x_{i,s} \in [0,1]$ is a decision variable s.t., if $x_{i,s}=0$, shard s is not being scheduled for copying in window i. If $0<x_{i,s}<=1$, the value of the variable signifies the fraction of the shard to be transferred in window i. The capacity restriction (disk bandwidth restriction) is of the form: $\foreach i \in [1, W], \sum_{s}^{H} x_{i,s}*G_{s}/D<=C$, where $G_{s}$ is the size of shard s.

This LP problem be solved by of an LP solvers (e.g., ILOG CPLEX) efficiently even for very large number of variables (shards*#of time windows). Since probability of being referenced (by writing) for the shard represents its "value", the LP solution will tend to schedule copying of the larger fractions of shards that are more likely to be referenced in the close (in time) windows. By proper configuring C, D, W and G parameters, it is possible to achieve the background copying process that will not interfere with the normal disk operation and will copy enough most probably referenced shards in advance so that the write requests to the clone will not be significantly punished on the average.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
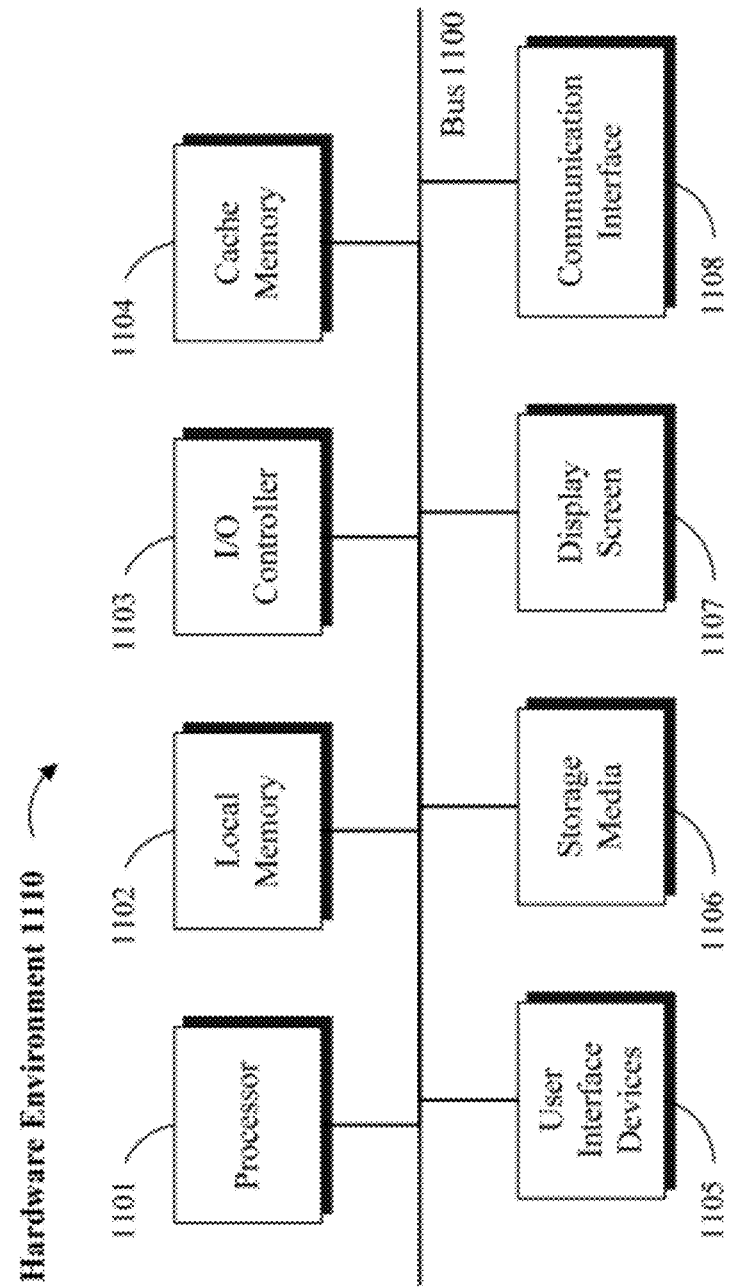
FIGS. 4A and 4B are block diagrams of hardware and software environments in which the disclosed systems and methods may operate, in accordance with one or more embodiments.
Figure 4B:
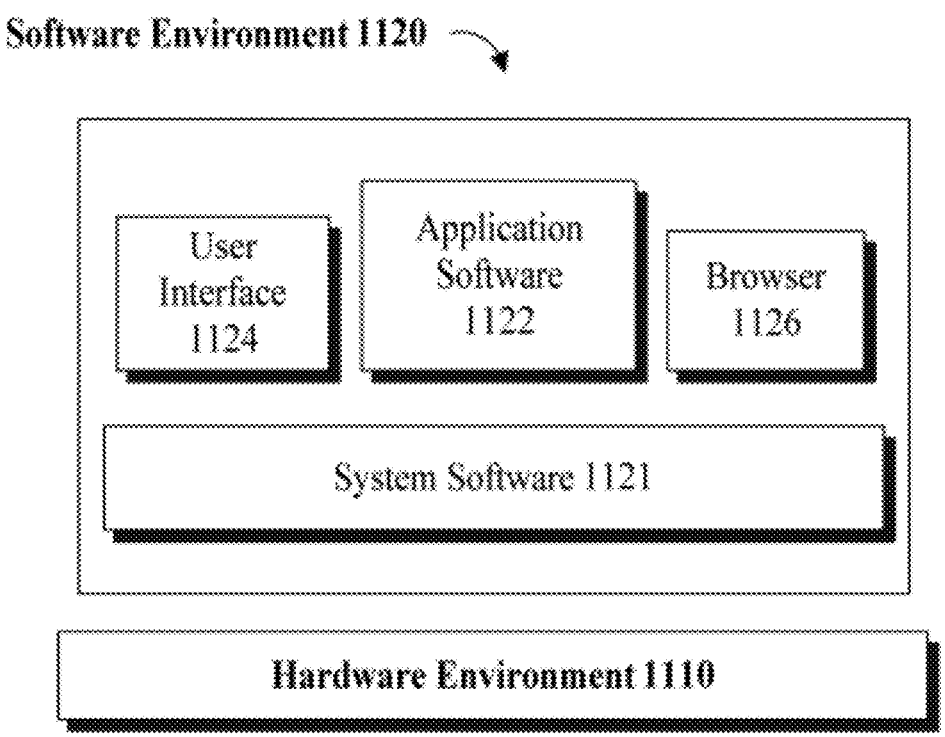

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

As noted earlier, certain embodiments may be implemented in a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Using the on-demand self-service, a cloud consumer may unilaterally provision computing capabilities, such as server time and network storage, as needed automatically without requiring human interaction with the service's provider. Broad network access capabilities may be available over a network and accessed through standard mechanisms that promote use by heterogeneous thin or thick client platforms (e.g., mobile phones, laptops, and PDAs).

Resource pooling allows the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity capabilities may be rapidly and elastically provisioned, in some cases automatically, to quickly scale out and rapidly released to quickly scale in. To the consumer, the capabilities available for provisioning often appear to be unlimited and may be purchased in any quantity at any time. Measured service allows cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Several service models are available, depending on implementation. Software as a Service (SaaS) provides the capability to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS) provides the capability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) provides the capability to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Several deployment models may be provided. A private cloud provides a cloud infrastructure that is operated solely for an organization. It may be managed by the organization or a third party and may exist on-premises or off-premises. A community cloud provides a cloud infrastructure that is shared by several organizations and supports a specific community that has shared concerns (e.g., mission, security requirements, policy, and compliance considerations). It may be managed by the organizations or a third party and may exist on-premises or off-premises.

A public cloud may provide a cloud infrastructure that is made available to the general public or a large industry group and is owned by an organization selling cloud services. A hybrid cloud provides a cloud infrastructure that is a composition of two or more clouds (private, community, or public) that remain unique entities but are bound together by standardized or proprietary technology that enables data and application portability (e.g., cloud bursting for load-balancing between clouds).

Figure 5A:
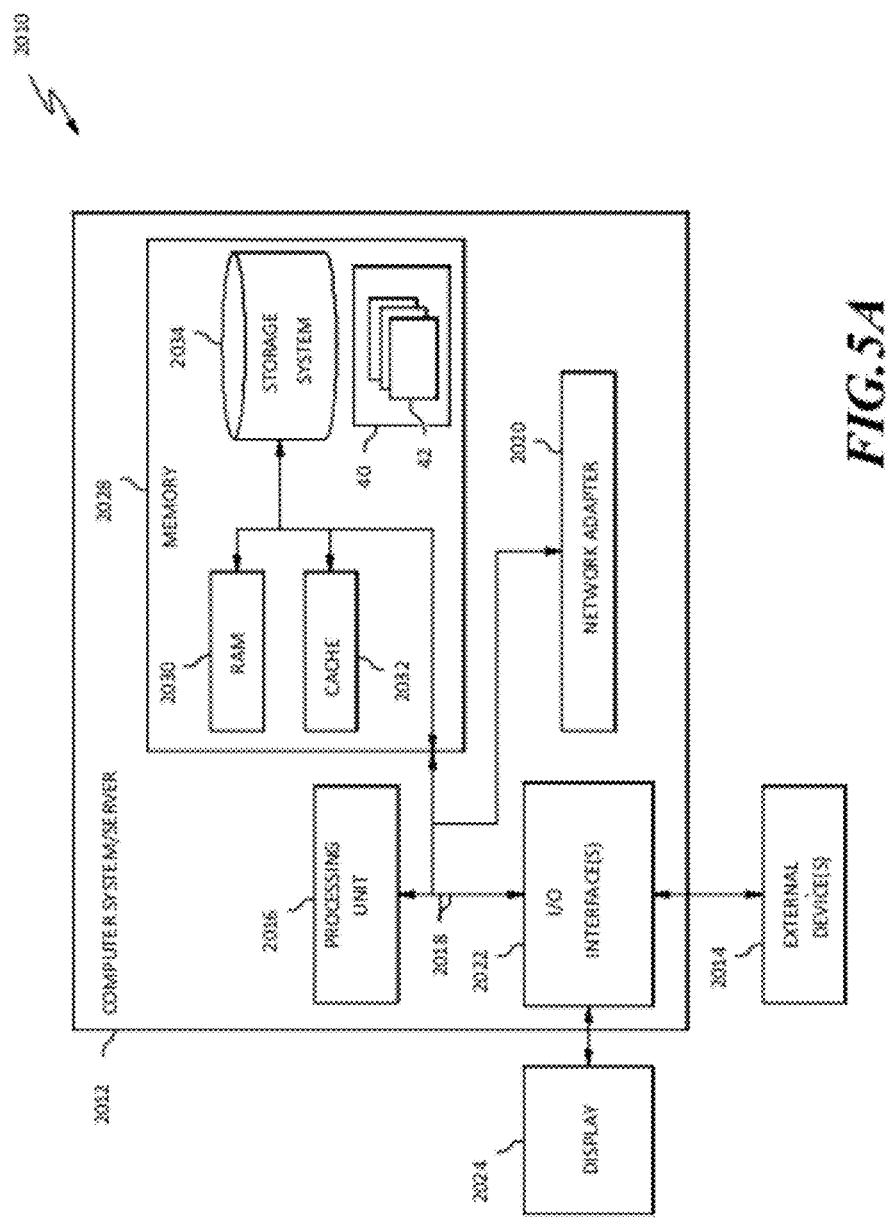
FIG. 5A depicts a cloud computing node according to one embodiment.

A cloud computing environment is service oriented with a focus on statelessness, low coupling, modularity, and semantic interoperability. At the heart of cloud computing is an infrastructure comprising a network of interconnected nodes. Referring now to FIG. 5A, a schematic of an example of a cloud computing node is shown. Cloud computing node 2010 is one example of a suitable cloud computing node and is not intended to suggest any limitation as to the scope of use or functionality of embodiments described herein. Regardless, cloud computing node 2010 is capable of being implemented and/or performing any of the functionality set forth hereinabove.

In cloud computing node 2010, there is a computer system/server 2012, which is operational with numerous other general purpose or special purpose computing system environments or configurations. Examples of well-known computing systems, environments, and/or configurations that may be suitable for use with computer system/server 2012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 2012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5A, computer system/server 2012 in cloud computing node 2010 is shown in the form of a general-purpose computing device. The components of computer system/server 2012 may include, but are not limited to, one or more processors or processing units 2016, a system memory 2028, and a bus 2018 that couples various system components including system memory 2028 to processor 2016.

Bus 2018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 2012 typically includes a variety of computer system readable media. Such media may be any available media that is accessible by computer system/server 2012, and it includes both volatile and non-volatile media, removable and non-removable media. System memory 2028 may include computer system readable media in the form of volatile memory, such as random access memory (RAM) 30 and/or cache memory 32.

Computer system/server 2012 may further include other removable/non-removable, volatile/non-volatile computer system storage media. By way of example, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided.

In some instances, the above components may be connected to bus 2018 by one or more data media interfaces. As will be further depicted and described below, memory 2028 may include at least one program product having a set (e.g., at least one) of program modules that are configured to carry out the functions of one or more embodiments.

Program/utility 2040, having a set (at least one) of program modules 42, may be stored in memory 2028 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of one or more embodiments.

Computer system/server 2012 may also communicate with one or more external devices 2014 such as a keyboard, a pointing device, a display 2024, etc.; one or more devices that enable a user to interact with computer system/server 2012; and/or any devices (e.g., network card, modem, etc.) that enable computer system/server 2012 to communicate with one or more other computing devices. Such communication may occur via I/O interfaces 2022. Still yet, computer system/server 2012 may communicate with one or more networks such as a local area network (LAN), a general wide area network (WAN), and/or a public network (e.g., the Internet) via network adapter 2020.

As depicted, network adapter 2020 communicates with the other components of computer system/server 2012 via bus 2018. It should be understood that although not shown, other hardware and/or software components could be used in conjunction with computer system/server 2012. Examples, include, but are not limited to: microcode, device drivers, redundant processing units, external disk drive arrays, RAID systems, tape drives, and data archival storage systems, etc.

Figure 5B:
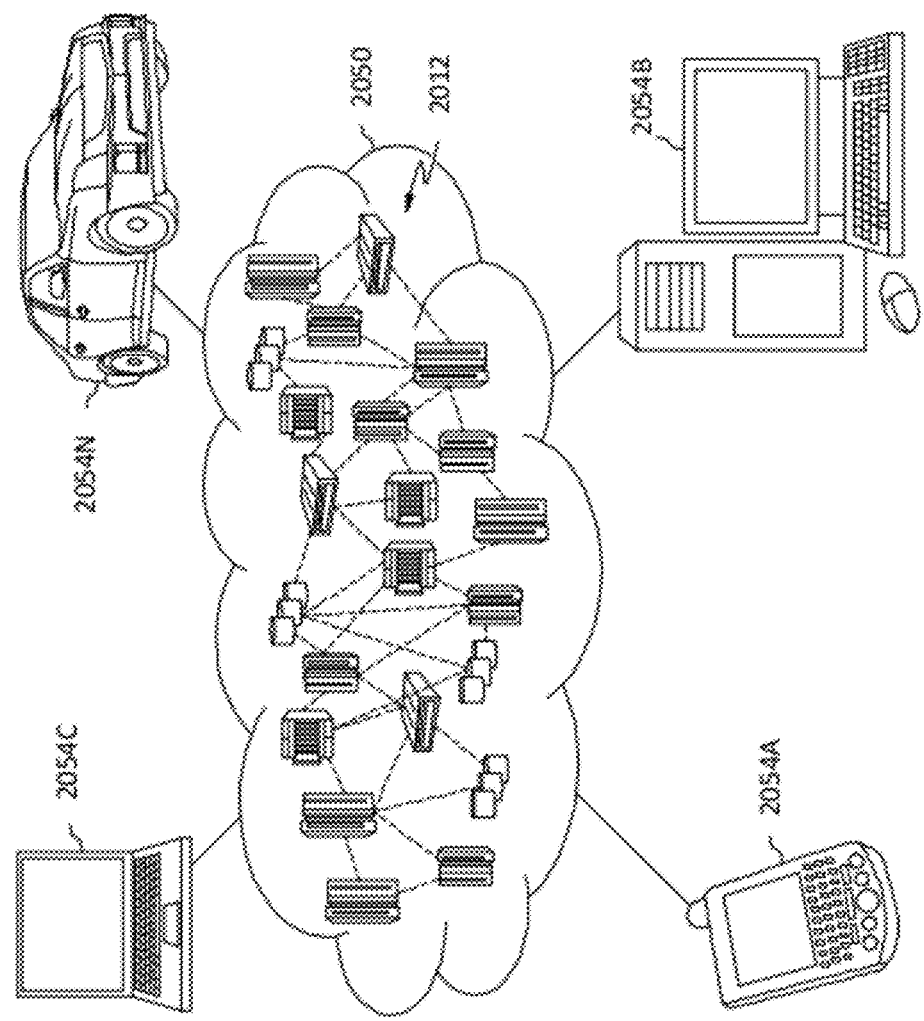
FIG. 5B depicts a cloud computing environment according to one embodiment.

Referring now to FIG. 5B, illustrative cloud computing environment 2050 is depicted. As shown, cloud computing environment 2050 comprises one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate.

Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device.

It is understood that the types of computing devices 54A-N shown in FIG. 5B are intended to be illustrative only and that computing nodes 2010 and cloud computing environment 2050 may communicate with any type of computerized device over any type of network and/or network addressable connection (e.g., using a web browser).

Figure 5C:
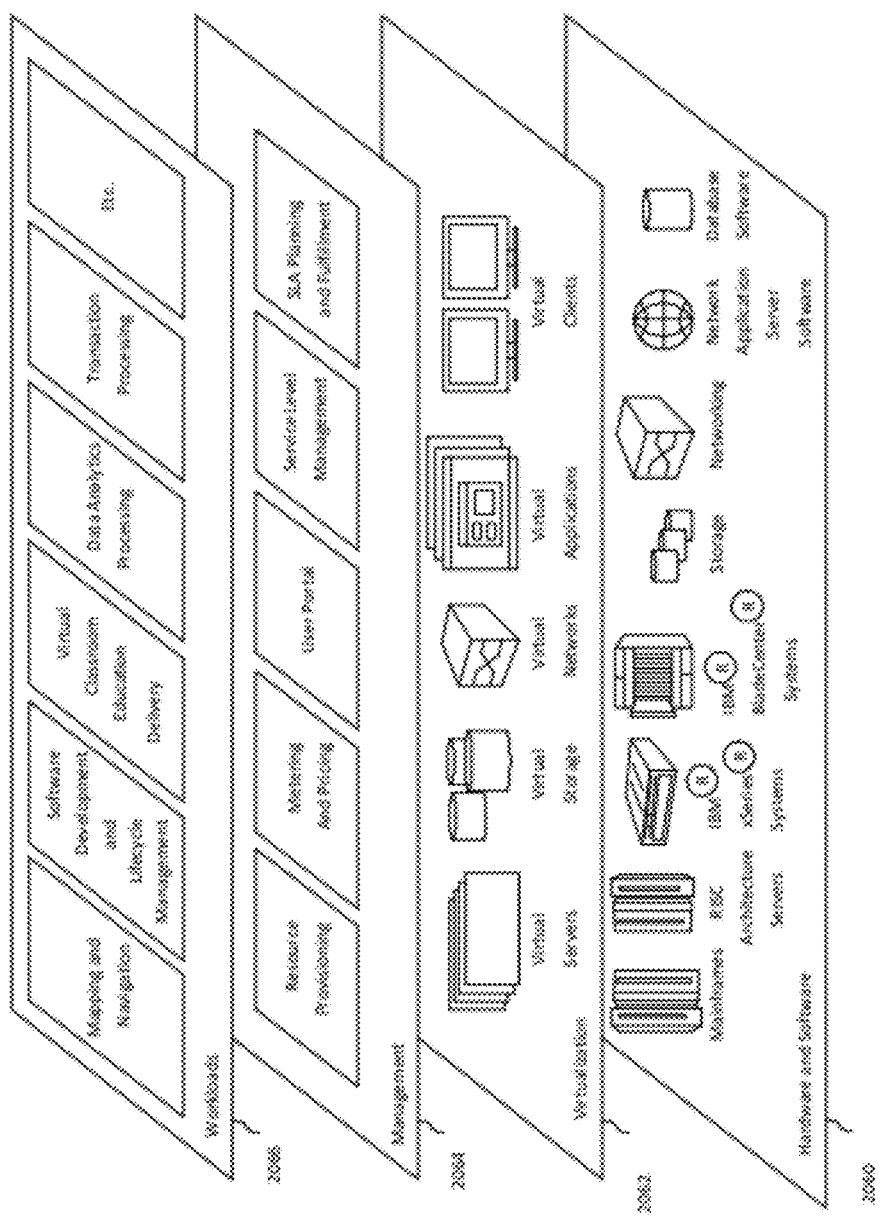
FIG. 5C depicts abstraction model layers according to one embodiment.

Referring now to FIG. 5C, a set of functional abstraction layers provided by cloud computing environment 2050 (FIG. 5B) is shown. It should be understood in advance that the components, layers, and functions shown in FIG. 5C are intended to be illustrative of one or more embodiments and are not limited thereto. As depicted, the following layers and corresponding functions are provided.

Hardware and software layer 2060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 2062 provides an abstraction layer from which the following examples of virtual entities may be provided: virtual servers; virtual storage; virtual networks, including virtual private networks; virtual applications and operating systems; and virtual clients. In one example, management layer 2064 may provide the functions described below. Resource provisioning provides dynamic procurement of computing resources and other resources that are utilized to perform tasks within the cloud computing environment.

Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met.

Service Level Agreement (SLA) planning and fulfillment provide pre-arrangement for, and procurement of, cloud computing resources for which a future requirement is anticipated in accordance with an SLA. Workloads layer 2066 provides examples of functionality for which the cloud computing environment may be utilized. Examples of workloads and functions which may be provided from this layer include: mapping and navigation; software development and lifecycle management; virtual classroom education delivery; data analytics processing; transaction processing; etc.

What is claimed is:

1. A method for deploying a virtual machine (VM) on a plurality of hosts in a distributed computing environment, the method comprising:
    notifying at least one host from among a plurality of hosts to download a master copy of a VM image from a remotely located network storage device to a storage medium locally connected to the at least one host, in response to a service provider providing a definition manifest for a service request that is to be serviced by the VM, wherein the definition manifest is provided to a centralized site management unit that is in communication with the plurality of hosts in a communications network, wherein the centralized site management unit communicates at least part of the definition manifest to the at least one host to notify the host to download the master copy of the VM image, wherein the definition manifest provides predefined specifications on how to customize the VM to run on the host, so that the VM is able to service the service request, wherein the definition manifest further provides rules about when to deploy additional VMs on the host to service additional service request, wherein the host replicates a copy of the downloaded VM image in a local cache associated with the host so that the host customizes and deploys the VM directly from the locally replicated copy of the VM image, without having to modify the master copy of the VM image downloaded to the storage medium locally connected to the host, wherein deployment of the VM on the host allows the host to locally service the service request associated with the definition manifest, wherein the host replicates copies of the downloaded VM image in the local cache, by way of copy-on-write, to generate one or more VM clones;

wherein the host customizes the one or more VM clones based on the definition manifest, wherein the copy-on-write process creates a pointer to the VM image in the local cache to create an instant VM clone of the VM image without actual copying of the VM image stored in the storage medium locally connected to the host, such that same VM image is shared among multiple VM clone instances without the need to shut down the VM's already deployed on the host.

2. The method of claim 1, wherein the one or more VM clones are cached by the host on the storage medium locally connected to the host, in response to determining that the network bandwidth is less than a threshold level.

3. The method of claim 1, wherein the one or more VM clones are cached by the host on a shared storage device, in response to determining that the network bandwidth is greater than a threshold level.

4. The method of claim 1, wherein the one or more VM clones are created from a single master image.

5. The method of claim 1, wherein a background synchronization policy is implemented to maximize chances of having blocks of the one or more VM clones when the blocks are referenced for writing.

6. The method of claim 1, wherein at least one copy of the VM image is cloned by the host by way of copy-on-write procedure prior to receiving an additional service request for services provided by the VM deployed by the host.

7. The method of claim 1, wherein the one or more VM clones are cached by the host on a direct attached storage (DAS) device.

8. The method of claim 1, wherein the one or more VM clones are cached by the host on a shared storage area network (SAN) device or a shared network attached storage (NAS) device.

9. The method of claim 1, wherein the host determines how often or how many copies of the VM image are to be cloned.

10. The method of claim 1, wherein the one or more VM clones are synchronized in the background after the copy-on-write procedure is initiated.

11. The method of claim 1, wherein the master copy of the VM image is copied by the host from one or more peer hosts.

12. The method of claim 1, wherein two or more hosts download concurrently and independently download the master copy of the VM image.

13. The method of claim 12, wherein the master copy of the VM image is downloaded from one or more peer hosts.

14. A system comprising:
one or more processors for deploying a virtual machine (VM) on a host;
a logic unit for notifying at least one host from among a plurality of hosts to download a master copy of a VM image from a remotely located network storage device to a storage medium locally connected to the at least one host, in response to a service provider providing a definition manifest for a service request that is to be serviced by the VM, wherein the definition manifest is provided to a centralized site management unit that is in communication with the plurality of hosts in a communications network, wherein the centralized site management unit communicates at least part of the definition manifest to the at least one host to notify the host to download the master copy of the VM image, wherein the definition manifest provides predefined specifications on how to customize the VM to run on the host, so that the VM is able to service the service request, wherein the definition manifest further provides rules about when to deploy additional VMs on the host to service additional service request, wherein the host replicates a copy of the downloaded VM image in a local cache associated with the host so that the host customizes and deploys the VM directly from the locally replicated copy of the VM image, without having to modify the master copy of the VM image downloaded to the storage medium locally connected to the host, wherein deployment of the VM on the host allows the host to locally service the service request associated with the definition manifest, wherein the host replicates copies of the downloaded VM image in the local cache, by way of copy-on-write, to generate one or more VM clones,;

wherein the host customizes the one or more VM clones based on the definition manifest, wherein the copy-on-write process creates a pointer to the VM image in the local cache to create an instant VM clone of the VM image without actual copying of the VM image stored in the storage medium locally connected to the host, such that same VM image is shared among multiple VM clone instances without the need to shut down the VM's already deployed on the host.

15. A computer program product comprising a non-transitory data storage medium having a computer readable program, wherein the computer readable program when executed on a computer causes the computer to:

notify at least one host from among a plurality of hosts to download a master copy of a VM image from a remotely located network storage device to a storage medium locally connected to the at least one host, in response to a service provider providing a definition manifest for a service request that is to be serviced by the VM, wherein the definition manifest is provided to a centralized site management unit that is in communication with the plurality of hosts in a communications network, wherein the centralized site management unit communicates at least part of the definition manifest to the at least one host to notify the host to download the master copy of the VM image,
wherein the definition manifest provides predefined specifications on how to customize the VM to run on the host, so that the VM is able to service the service request,
wherein the definition manifest further provides rules about when to deploy additional VMs on the host to service additional service request,
wherein the host replicates a copy of the downloaded VM image in a local cache associated with the host so that the host customizes and deploys the VM directly from the locally replicated copy of the VM image, without having to modify the master copy of the VM image downloaded to the storage medium locally connected to the host,
wherein deployment of the VM on the host allows the host to locally service the service request associated with the definition manifest,
wherein the host replicates copies of the downloaded VM image in the local cache, by way of copy-on-write, to generate one or more VM clones,;
wherein the host customizes the one or more VM clones based on the definition manifest,
wherein the copy-on-write process creates a pointer to the VM image in the local cache to create an instant VM clone of the VM image without actual copying of the VM image stored in the storage medium locally connected to the host, such that same VM image is shared among multiple VM clone instances without the need to shut down the VM's already deployed on the host.

* * * * *